May 5, 1936.　　　　　C. AALBORG　　　　　2,039,376

CIRCUIT CONTROLLING APPARATUS

Filed May 15, 1934　　　　3 Sheets-Sheet 1

WITNESSES:

INVENTOR
CHRISTIAN AALBORG.
BY
ATTORNEY

May 5, 1936.    C. AALBORG    2,039,376
CIRCUIT CONTROLLING APPARATUS
Filed May 15, 1934    3 Sheets-Sheet 3

INVENTOR
CHRISTIAN AALBORG.

Patented May 5, 1936

2,039,376

UNITED STATES PATENT OFFICE 2,039,376

CIRCUIT CONTROLLING APPARATUS

Christian Aalborg, Springfield, Mass., assignor to Westinghouse Electric & Manufacturing Company, East Pittsburgh, Pa., a corporation of Pennsylvania Application May 15, 1934, Serial No. 725,764

12 Claims. (Cl. 200—83)

This invention relates to electric circuit controlling apparatus and it has for a purpose to provide improved apparatus of this kind.

Circuit controlling apparatus constructed in accordance with the present invention, is applicable for controlling electrically operated devices in accordance with predetermined conditions to be maintained, and is particularly applicable to the control of electric refrigerators, in which the circulation of refrigerant is regulated in accordance with predetermined temperature conditions in the refrigerator.

It is an object of this invention to provide an improved circuit controller which is automatically opened and closed in accordance with predetermined conditions to be maintained, and which may be readily adjusted at will for varying said conditions, or for maintaining the controller open or closed regardless of the conditions.

A further object of this invention is to provide an improved circuit controller for an electric motor in which the various controlling elements are included in a unitary structure.

A still further object of the present invention is to provide apparatus which may be easily assembled or disassembled and which may be readily adjusted in service.

These and other objects are effected by my invention as will be apparent from the following description and claims taken in accordance with the accompanying drawings, forming a part of this application, in which:

Figure 1:
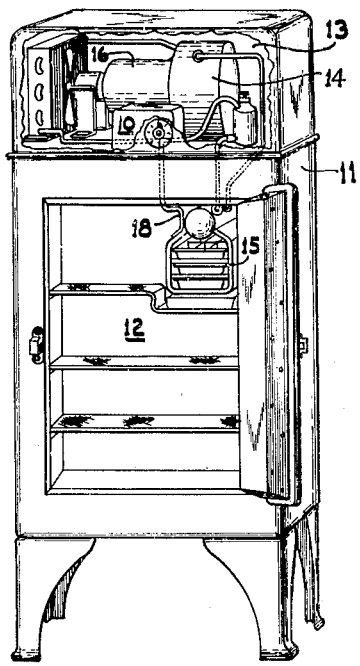
Fig. 1 is a view of a domestic electrical refrigerator having my novel control apparatus applied thereto.
Figure 11:
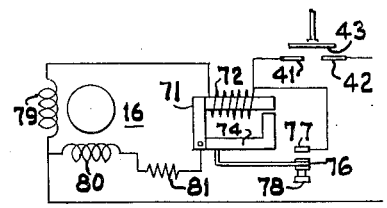
Figure 5:
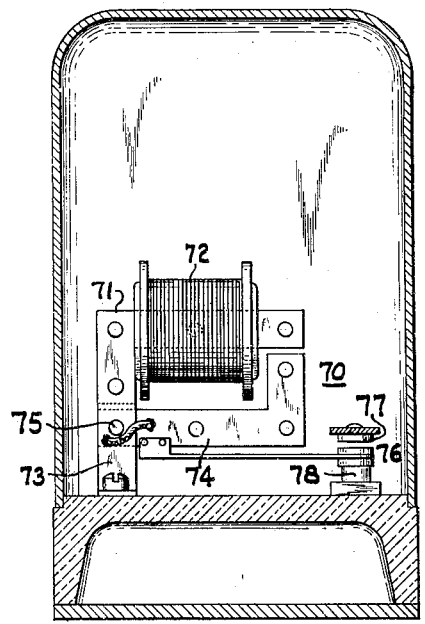
Figure 4:
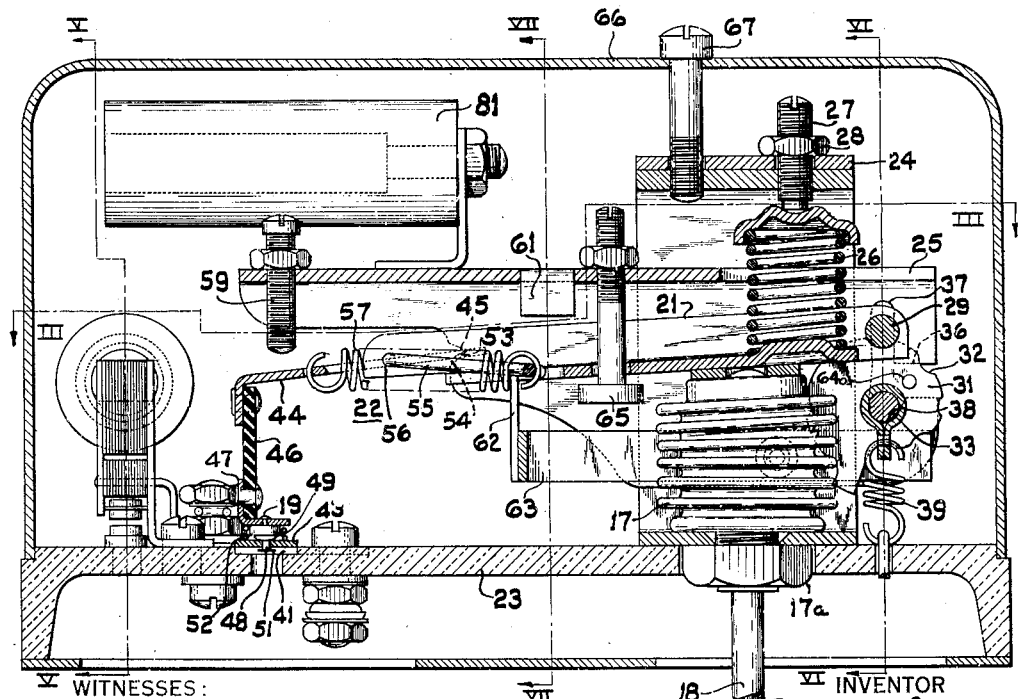
Fig. 4 is a sectional view taken along the line IV—IV of Fig. 3.
Figures 8, 9:
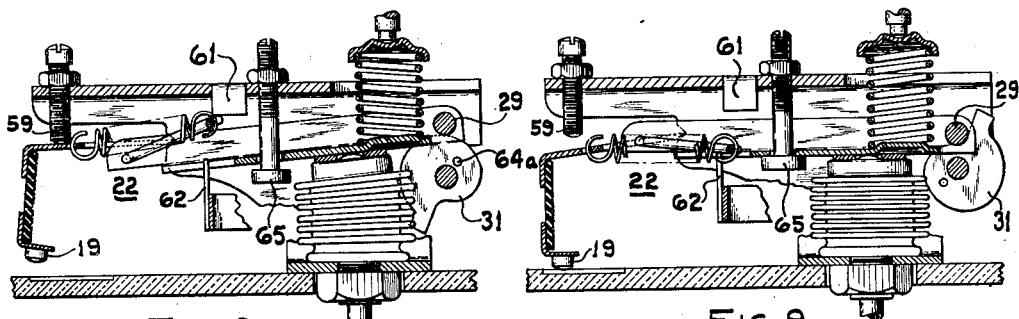
Figure 10:
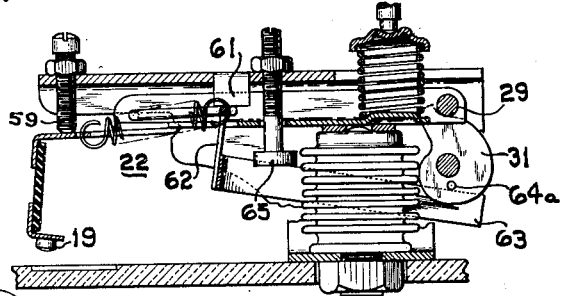
Figure 6:
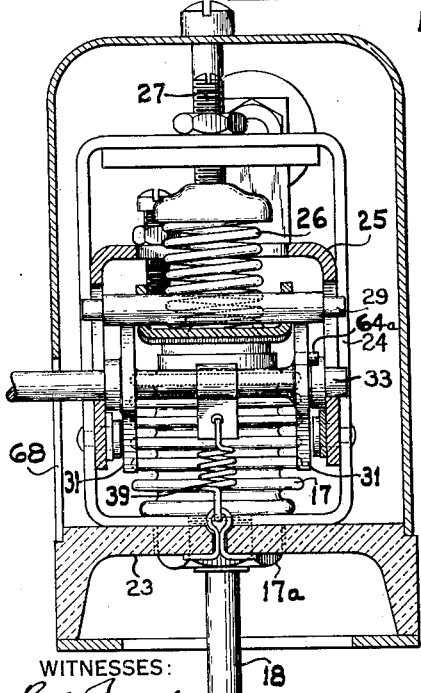
Figure 7:
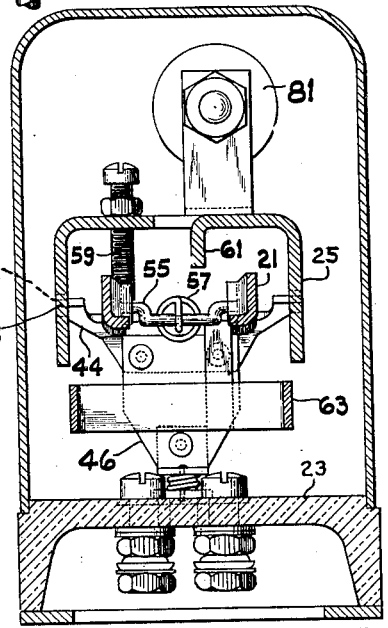

Figs. 5, 6, and 7 are sectional views taken along the lines V—V, VI—VI, and VII—VII of Fig. 4, respectively;

Figs. 8, 9, and 10 are views, showing positions assumed by various elements of my novel apparatus under different operating conditions; and Fig. 11 is a diagram of electric connections of the refrigerator motor shown in Fig. 1.

Referring now to Fig. 1, I show my novel circuit controlling device, generally indicated at 10, applied to a refrigerator 11 of the domestic type. The refrigerator 11 includes a cooling compartment 12 and a machine compartment 13, within which, a refrigerating machine 14 of the compressor-expander type is disposed. An evaporator 15 is arranged within the compartment 12 for abstracting heat therefrom and is supplied with refrigerant by the machine 14 in a well understood manner. The refrigerating machine 14 is driven by a motor 16, the electric circuit of which is controlled by the control device 10. As the operation of refrigerating apparatus of the type disclosed is well understood, no detailed description of it is deemed necessary. However, as the temperature of the compartment 12 rises above a predetermined degree, the motor 16 is energized and operates the refrigerating machine 14 so that refrigerant is circulated through the evaporator 15. Heat is therefore abstracted from evaporator 15 and the compartment 12, and, as the temperature of the latter is depressed to the desired degree, the motor 16 is deenergized for terminating the circulation of refrigerant. Energization of motor 16 is controlled by my improved circuit controlling device 10, which includes a thermal element responding to the temperature of the compartment 12.

Referring now to the remaining figures of the drawings, the thermal element of the circuit controller 10 includes an expansible bellows 17 having a tube 18 communicating therewith. The tube 18 and bellows 17 define a closed chamber within which an expansible and, preferably, volatile fluid is contained. The tube 18 is extended into the compartment 12 and is preferably secured to the evaporator 15. As the temperature of the compartment 12 increases and decreases, the pressure of the fluid within the tube 18 and bellows 17 will increase and decrease correspondingly, as is well understood. The bellows 17 will, therefore, expand and contract with increases and decreases in temperatures within the compartment 12.

The circuit of the electric motor 16 is controlled by the switch 19 which switch is opened and closed by movement of the bellows 17 through the medium of a lever 21 and a snap acting mechanism 22. The various elements of the circuit controlling device 10 are supported by a base 23 to which a yoke 24 is secured. A bracket 25 is attached to the yoke 24 and extends parallel to the base 23 in spaced relation thereto. The bellows 17 is secured to the yoke 24 by means of the nut 17a, through which the tube 18 passes. Movement of the bellows 17 is transmitted to the lever 21 adjacent one of its ends, which movement is opposed by a resilient member, such as, for example, a spring 26 bearing against the upper side of the lever 21. Adjustment of the spring 26 is provided by a screw 27 threaded in the yoke 24 and having a locking nut 28 for securing it in place when properly adjusted.

The lever 21 is provided with a pin 29 about which it rotates and the pin 29 is supported by cams 31 having indentations 32 formed on the surfaces thereof. As the cams 31 are members of an adjusting mechanism for varying the temperatures at which the bellows 17 opens and closes the switch 19, it will be understood that there will be an indentation for each setting of the mechanism. The cams 31 are fixed to a shaft 33. An adjusting knob 34 is secured to the shaft 33 for adjusting the controller. A dial 35 is associated with the knob 34 for indicating the setting of the controller. The bracket 25 has a slot 36 formed therein adjacent one of its ends for the reception of the pin 29 and the shaft 33. Opposed offset portions 37 and 38 of the slot 36 provide a guide for the pin 29 and a bearing for the shaft 33, respectively. A spring 39 may be provided for urging the shaft 33 toward its bearing 38. This construction facilitates assembly of the lever 21 and the shaft 33 to the bracket 25. The lever 21 and its pin 29 may be assembled to the bracket 25 by passing the pin 29 through the slot 36 before moving it upwardly into the offset portion 37. Similarly, the cam and shaft assembly may be inserted in the slot 36 and then snapped into the offset portion 38 of the slot 36 by means of the spring 39.

As the bias of the spring 26 is imposed on the lever 21 downwardly between the bellows 17 and the pin 29, it will be apparent that the pin 29 will be maintained in engagement with the cams 31. The temperatures at which the switch 19 open and close are determined by the position of the pivot 29. Rotation of the knob 34 and the cams 31 in a clockwise direction as viewed in Fig. 4 will increase the temperatures at which the switch 19 opens and closes. This direction of rotation would cause the pin 29 to move upwardly in the offset portion 29 of the slot 36 and the lever 21 would move slightly in a counterclockwise direction about the bellows 17. Therefore, it would require greater amplitudes of the bellows to open and close the switch 19 than those which are effective when the control is in the position shown in Fig. 4. Conversely, when the control knob 34 is rotated in a counterclockwise direction, the pin 29 is lowered in the offset 37 and the lever moves in a clockwise direction, so that decreased amplitudes of the bellows are necessary to effect operation of the switch 19. As the amplitudes assumed by the bellows 17 are dependent upon the temperature within the compartment 12, it will be obvious that various temperatures within the compartment 12 may be obtained by properly adjusting the knob 34. Further reference to the operation of the temperature adjusting mechanism will be made hereinafter.

The switch 19 includes first and second stationary contacts 41 and 42, a movable contact 43 and a support 44 for the movable contact 43, which support is pivoted at 45 in the bracket 25. The support 44 includes an insulating member 46 having an angle 47 secured thereto, the latter supporting the contact 43 by means of pin 48. Limited movement of the contact 43 axially of the pin 48 is provided between an enlarged portion 49 of the pin 48 and a head portion 51. A spring 52 bearing against the angle 47 and the contact 43, biases the latter toward the contacts 41 and 42. With this construction, wiping of the contacts 41, 42, and 43 is provided during opening and closing operations. When open, the contact 43 engages the head 51 due to the bias of the spring 52 and, as it is closed, it first engages the stationary contacts 41 and 42 somewhat to the left of the position assumed in Fig. 4. Further movement of the support 44 in a closing direction causes the spring 52 to compress and contact 43 to slide on the contacts 41 and 42 to the right as viewed in Fig. 4. Clean contacts are maintained by the wiping action thereof.

The pivot 45 is of the knife edge type, in which knife edges 53 are formed on the support 44 and bear against V-shaped bearings 54 in the bracket 25. The snap action mechanism includes a bail 55, pivoted at 56 in the lever 21 and having its free end attached to a tension spring 57, the latter being attached at its other end to the switch support 44. In addition to its snap acting function, the spring 57 maintains the knife edges 53 in engagement with the V-shaped bearings 54 and thereby maintains the switch support 44 in position. Lateral movement of the support 44 is prevented by projections 58 extending within the sides of the bracket 25. It will be seen that the knife edge pivot construction facilitates removal of the movable element of the switch 19, as by merely detaching the spring 57 from the support 44, the assembled movable element of the switch may be removed for inspection or replacement.

Figure 3:
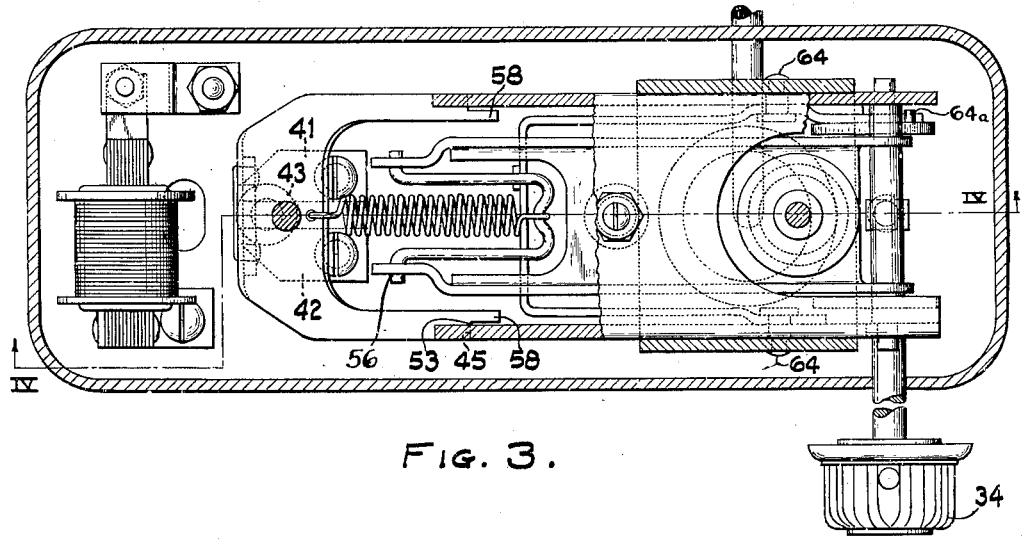
Fig. 3 is a plan view of my improved circuit controller having parts broken away for clearness.

The range of movement of the support 44 and contact 43 may be adjusted, as for example, by a screw 59. This adjustment provides for various temperature differentials or, in other words, the upper and lower temperatures at which the switch closes and opens. The movement of bail 55 is limited in an upwardly direction by the stop 61 and in a downward direction by stop 62. The former is attached to the bracket 25 and is fixed, and the latter is secured to a lever 63 pivoted on fixed pins 64. The lever 63 extends in proximity to the sides of the cams 31 as best shown in Fig. 3. Aligned with the lever 63 and secured to the cams 31 are pins 64a which engage the lever 63 when the cams 31 are adjusted to one of their selective positions. Further reference to this construction and its operation will be made hereinafter. Downward movement of the lever 21 may be limited by an adjustable stop 65 threaded in the bracket 25.

The various elements of the controller which are supported by the base 23 are preferably protected by an enclosing cover 66 whch is secured to the base 23 by means of a screw 67. A slot 68 is formed in the cover 66 so that it may be passed over the cam shaft 33 when assembling or removing it from the base.

When used to control motors having a relay for controlling a starting winding, or different running and starting connections for an auxiliary winding, I prefer to mount such relay within the housing of the circuit controlling mechanism 10. The numeral 70 indicates a relay of novel construction for the motor 16 and is secured to the base 23 adjacent the circuit controlling switch 19. The relay 70 includes a core member 71 formed of L-shaped laminations having a coil 72 mounted thereon. The core 71 is supported by a bracket 73 secured to the base 23 and an armature 74 is pivoted to the bracket 73 as shown at 75. The laminations forming the armature 74 are of the same size and shape as the laminations used in the construction of the core 71, so that the same tools may be used for stamping the laminations of both. A substantial saving in the cost of manufacture of the relay is thereby effected. The relay 70 includes also a movable contact 76 and stationary contacts 77 and 78.

In Fig. 11, I have shown a wiring diagram for motor 16, which motor is disclosed, by way of example, of a conventional split phase induction type, including running and starting windings 79 and 80, respectively. The coil 72 is in circuit with the running winding 79 and during starting, responds to the relatively high starting current flowing in the winding 79 to attract the armature 74, thereby engaging contacts 76 and 77. The latter operation energizes the starting winding 80 until the current in the running winding 79 and coil 72 has been reduced to a predetermined value, due to the increase in speed of the motor, at which time the armature 74 drops by gravity and opens the circuit to the starting winding 80. When a resistor 81 or other current limiting device is used in the starting circuit, I prefer to assemble it with the other elements of the circuit controlling mechanism 10, as shown in Fig. 4. The contact 78 is used in the example shown as a stop for the armature 74 but it will be understood that with other types of motors, the contact 78 may be electrically connected in a main or controlling circuit.

Operation

Figure 2:
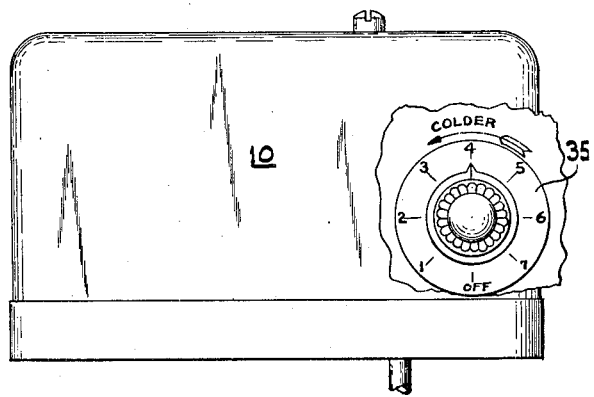
Fig. 2 is a front view of the control apparatus of Fig. 1.

The operation of my novel circuit controlling apparatus will now be described. The adjusting knob 34, as shown in Fig. 2, is in the number 4 position in which the temperature of the evaporator 15 is maintained between predetermined high and low temperatures, for example, 28° F. and 14° F., respectively. The switch 19 is closed and the motor 16 operates to circulate refrigerant through the evaporator 15 for cooling the same. The bellows 17 contracts during this cooling period permitting the spring 26 to rotate the lever in a counterclockwise direction about the pivot 29. When the temperature of the evaporator 15 has been depressed to 14°, the pivot 56 will be slightly below the axis of the spring 57 which then swings the free end of the bail 55 upward until it engages the stop 61. As the axis of the spring 57 passes the axis of the knife edge pivots 45, the spring 57 causes the switch support 44 to rotate in a clockwise direction about its pivot 45 until the support 44 engages the adjusting screw 59. The switch 19 is therefore open, as shown in Fig. 8, and operation of the motor 16 is terminated.

Circulation of refrigerant through the evaporator 15 ceases and, as the temperature of the evaporator 15 increases during the shut down period, the bellows 17 expands. The pivot 56 raises with the expansion of the bellows 17 and passes beyond the axis of the spring 57 when the temperature of the evaporator 15 increases to 28°. This causes the spring 57 to swing the free end of the bail 55 downwardly into engagement with the stop 62. As the axis of the spring 57 passes below the axis of the pivot 45, the spring bias moves the switch support 44 downwardly thereby effecting closure of the switch 19. The motor 16 is energized as described heretofore and initiates circulation of refrigerant through the evaporator 15.

Adjustment of the knob 34 and cams 31 in a clockwise direction increases both the high and low temperatures at which the switch 19 operates, as the pivot is moved upwardly in the offset 37 and, therefore, the amplitude of movement of the bellows 17 necessary to open and close the switch 19 is increased. Conversely counterclockwise rotation of the knob 34 and cams 31 would permit the pivot 27 to move downwardly in the offset 37 and the amplitude of movement of the bellows 17 effective to operate the switch 19 is decreased. Therefore the evaporator 15 would be maintained at lower temperatures, for example 22° to 10°.

In controlling refrigerating apparatus of the household type, it is desirable that provision be made for continuous running of the motor 16 so that quick freezing may be accomplished in the evaporator 15. The adjustable stop 65 is provided for this purpose and is so disposed that, when the knob 34 is moved to the #1 position, downward movement of the lever 21 is arrested before it attains a switch opening position, that is, before the pivot 56 passes beyond the axis of the spring 57. In the number 1 setting, the pivot pin 29 is in its lowermost position as shown in Fig. 9. Regardless the amount of contraction of the bellows 17, due to continued refrigerant circulation, the spring 26 is ineffective to move the lever 21 to a switch opening position as the stop 65 arrests downward movement of the lever 21.

During the operation of refrigerating apparatus, frost and ice collect on the evaporator which greatly reduces the rate of heat exchange between the compartment being cooled and the refrigerant. It is desirable that this collection of ice be removed periodically and this may be accomplished by terminating operation of the refrigerating machine for a period sufficiently long to permit the ice to melt. I, therefore, provide a control setting for rendering the motor 16 incapable of energization regardless of evaporator temperature. This position is designated "Off" on the dial 35 and, when the knob 34 is set to this position, the cams 31 are in the position shown in Fig. 10. In this setting, the pivot 29 is in its uppermost position in the offset slot portion 37 and the pins 64a on the cams 31, engage the lever 63, so that it is tilted, as shown.

Tilting of the lever 63 raises the stop 62 so that it engages the free end of the bail 55 and moves it upwardly toward the stop 61. This movement effects opening of the switch 19 regardless of the position of the main lever 21 as the axis of the spring 57 is moved above the axis of the knife edge pivot 45. It will be obvious that, as long as the bail 55 is maintained in an elevated position by the stop 62, closure of switch 19 cannot be effected.

Adjustment of the temperature differential is effected by the screw 59 which, if adjusted upwardly, increases the differential and, conversely, if adjusted downwardly, decreases the differential. In the example referred to heretofore, a temperature differential of 28° F. to 14° F. was specified. Assuming these temperatures are obtained with the apparatus as shown in Fig. 4 and that it is desired to vary the differential so that it closes at 26° and opens at 14°, the screw 59 would be adjusted downwardly. Adjustment of the screw 59 changes the position of the axis of the spring 57 when the switch 19 is in its open position, and, therefore, varies the amplitude of the bellows 17 which is effective to close the switch 19.

The knob 34 provides a single adjustment for the operator so that different temperatures may be obtained in the compartment 12. The adjustments 59, 65, and 27 are usually set before installation of the apparatus and may be termed "factory" adjustments. However, they may be adjusted subsequent to installation and, in this connection, it will be noted that removal of the screw 67 and cover 66 permits access to all of them. Furthermore, all adjustments 59, 65, and 27 are so arranged that they may be adjusted in a single direction.

From the foregoing, it will be seen that I have provided a novel electric circuit controlling mechanism for electrically operated devices in which predetermined conditions, such as pressure or temperature, may be maintained, and which may be readily adjusted at will to vary said predetermined conditions. Furthermore, assembly and disassembly of various parts of the mechanism may be readily effected and with a minimum number of tools. Factory and field adjustments as well as the user's adjustments are readily accessible and easily set.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In circuit controlling apparatus, the combination of a movable member, temperature-responsive means for actuating said member from one position to another, a movable circuit controlling device, a connection between said member and said device for imparting motion of the former to the latter in a snap acting manner, said connection including a bail pivoted in said member and a spring attached at one end to the bail and at its other end to the device, and manually-operated means for moving the bail independently of the movable member, whereby the connection is rendered ineffective to impart motion to the device.

2. In temperature control apparatus, the combination of a base member, an upright rigidly-mounted on the base member, a second member rigidly mounted on the upright member and spaced from the base member, a snap switch, a pivoted lever movable in response to temperature change for operating the snap switch, whereby an operating temperature range is provided, stops at one end of the lever for limiting movement thereof, said second member having a pair of opposed slots therein, a pin attached to the pivoted lever and engaging one of the slots, a cam member, and a second pin attached to the cam member and engaging the other slot, said cam engaging with the first pin to raise and lower one end of the pivoted lever to move the temperature range.

3. The combination of a movable member, thermostatic means for moving said member from one position to another in response to predetermined high and low temperatures, a pivot for said member, means for adjusting the pivot with respect to the thermostatic means whereby said predetermined temperatures are varied, a circuit controlling device having a fixed pivot, a mechanical connection between the member and the device for imparting snap acting movement to the latter when the former has been moved to one or the other of said positions, said connection including a bail pivoted in said member and a spring having one of its ends secured to the bail and its other end secured to the device, and means for moving the bail independently of the member, whereby the connection is rendered inoperable to impart movement of the member to the device when the member is moved to one of its positions.

4. The combination of a movable member, a circuit controlling device movable to open and closed positions, a mechanical connection between said member and said device and effective to impart snap acting opening and closing movement to the device when said member has been moved to predetermined first and second positions, respectively, said connection including a bail pivoted in said member, and a spring having one of its ends secured to the bail and its other end secured to the device, a pivot for said movable member, temperature-responsive means for actuating said movable member to its first and second positions in response to predetermined temperature conditions, means manually adjustable to a plurality of selective positions for adjusting said pivot so that said predetermined temperature conditions are varied, means effective in one position of the adjustable means for preventing movement of the movable member to its first position whereby said device is maintained closed, and means effective in another position of the adjustable means for engaging said bail whereby said connection is rendered ineffective to close said device.

5. The combination of a movable member, a circuit controlling device movable to open and closed positions, a mechanical connection between said member and said device for imparting snap acting movement to the latter when the former has been moved to predetermined first and second positions; said mechanical connection including a bail pivoted in said member and including a spring having one of its ends secured to the bail and having its opposite end secured to said device, a pivot for said movable member, an expansible bellows for moving said member in one direction, adjustable biasing means opposed to the bellows for moving the member in the opposite direction, means for supporting said pivot and movable to a plurality of selective positions for adjusting said pivot with respect to the bellows, an adjustable stop for limiting the movement of the movable member in one direction when the pivot supporting means is adjusted to one of its positions, and a lever actuated by said pivot supporting means when adjusted to another of its positions for engaging said bail.

6. In circuit controlling apparatus, the combination of a frame structure having a slot formed therein, a circuit controlling device including a lever, a pivot for the lever disposed in sliding relation within said slot, a cam for supporting said pivot and having a shaft journaled in said slot, temperature-responsive means carried by the frame structure for actuating said lever, a spring for biasing the lever in opposition to the temperature-responsive means and arranged intermediate of the temperature responsive means and the pivot, and means for adjustably rotating the cam.

7. In circuit controlling apparatus, the combination of a base member, a supporting structure secured to the base member and having a slot in one end thereof, said slot having opposed offset portions, a movable lever, temperature responsive means for actuating the lever, a circuit controlling device actuated by the lever, a pivot for the movable lever disposed in sliding relation in one of said offset portions of the slot, a cam for supporting said pivot, a shaft for the cam journaled in the other offset portion of the slot, means for urging said shaft toward the offset portion of the slot in which it is journaled, and means for rotating said shaft and cam.

8. In circuit controlling apparatus, the combination of a frame having a slot in one end thereof, said slot having opposed offset portions formed therein, a circuit controlling mechanism including a lever, a pivot for the lever disposed in sliding relation in one of said offset portions of the slot, a cam for supporting the pivot, a shaft for the cam journaled in the other of the offset portions, and being of a diameter smaller than the width of said slot, temperature-responsive means for actuating said lever, a spring for biasing said lever in opposition to the temperature-responsive means, and arranged intermediate of the temperature-responsive means and the pivot and means for adjustably rotating said cam.

9. The circuit controlling apparatus as claimed in claim 8 having means for urging said cam toward the offset portion of the slot in which it is journaled.

10. In circuit controlling apparatus, the combination of a frame structure, a circuit controlling device including a lever, a pivot secured to said lever and slidably arranged within the frame structure, a rotatable cam for supporting the pivot, temperature responsive means for actuating said lever, a spring for biasing said lever in opposition to the temperature responsive means and arranged intermediate the temperature responsive means and said pivot whereby the pivot is held in engagement with the cam, and means for adjusting the cam at will to a plurality of selective positions.

11. In temperature control apparatus, the combination of a snap switch, a lever movable in response to temperature change for operating the snap switch, whereby an operating temperature range is provided, a frame member having a slot formed therein, a pin for pivotally supporting said lever and slidably arranged within the slot, a cam for supporting said pin, a shaft for the cam journalled in the frame member, and means for moving the cam to a plurality of selective positions for adjusting the position of the pin whereby the operating temperature range is varied.

12. The combination as claimed in claim 11 having means for adjusting the range of movement of the lever.

CHRISTIAN AALBORG.